(12) United States Patent
Sears

(10) Patent No.: US 6,517,439 B1
(45) Date of Patent: Feb. 11, 2003

(54) U-JOINT CONSTRUCTION

(75) Inventor: Jeffrey L. Sears, Grinnell, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/956,437

(22) Filed: Sep. 19, 2001

(51) Int. Cl.[7] .............................. F16D 3/06; F16D 3/04
(52) U.S. Cl. ...................... 464/104; 464/162; 464/106
(58) Field of Search .................... 464/102, 104, 464/106, 147, 153, 154, 904, 162

(56) References Cited

U.S. PATENT DOCUMENTS

| | | | |
|---|---|---|---|
| 481,780 A | * | 8/1892 | Brown ..................... 464/102 |
| 1,128,432 A | | 2/1915 | Fetzer |
| 1,298,680 A | | 4/1919 | Dunham |
| 1,625,511 A | * | 4/1927 | Ungerer ..................... 464/106 |
| 1,829,392 A | * | 10/1931 | Caldwell ..................... 37/257 |
| 2,131,414 A | | 9/1938 | Westburgh |
| 2,892,328 A | | 6/1959 | Templeton |
| 2,965,400 A | | 12/1960 | Lehman |
| 3,935,938 A | | 2/1976 | Hodne |
| 4,272,972 A | | 6/1981 | James |
| 4,286,442 A | | 9/1981 | Peterson |
| 4,332,148 A | | 6/1982 | Maki et al. |
| 4,452,592 A | | 6/1984 | Tsai |
| 4,941,861 A | | 7/1990 | Painter |
| 4,995,849 A | | 2/1991 | Castellon |
| 5,022,645 A | | 6/1991 | Green |
| 5,078,650 A | | 1/1992 | Foote |
| 5,180,336 A | | 1/1993 | Guttinger |
| 5,226,852 A | | 7/1993 | Asaba et al. |
| 5,267,903 A | | 12/1993 | Kuribayashi |
| 5,358,445 A | | 10/1994 | Wuebker |
| 5,421,780 A | | 6/1995 | Vukovic |
| 6,162,125 A | | 12/2000 | Robertson et al. |

* cited by examiner

Primary Examiner—Lynne H. Browne
Assistant Examiner—Kenneth Thompson
(74) Attorney, Agent, or Firm—McKee, Voorhees & Sease, P.L.C.

(57) ABSTRACT

A U-joint construction includes a drive coupling member connected to a drive shaft, and intermediate coupling member, and a driven coupling member connected to a driven shaft. The drive coupling member and the driven coupling member include bearings which protrude within channels of the intermediate coupling member. The drive bearing and the driven bearing are each pivotal about two axes, one of which coincides with the longitudinal axes of the channel and the other which is transverse with respect thereto. According to one embodiment of the invention the first and second bearings are also longitudinally slidable within the channels.

29 Claims, 2 Drawing Sheets

— U-JOINT CONSTRUCTION

BACKGROUND OF THE INVENTION

The present invention relates to a U-joint construction for joining a drive shaft and a driven shaft.

In appliances as well as in other applications, it is sometimes necessary to couple a drive shaft to a driven shaft by means of a flexible coupling that permits relative misalignment between the drive shaft and the driven shaft. One prior art shaft coupling is shown in U.S. Pat. No. 5,267,903 and includes a drive coupling and a driven coupling which are attached to the drive shaft and the driven shaft. Between these two couplings is an intermediate coupling which engages the two couplings and transfers rotational movement therebetween. The intermediate coupling includes on one face a pair of spaced apart channels and on the opposite face a pair of spaced apart channels which run in a direction orthogonal or transverse to the ones on the opposite side of the intermediate coupling member. Each of the drive coupling and driven coupling include teeth which also engage in the channels on the opposite sides of the intermediate coupling member.

The intermediate coupling member permits the drive coupling and the driven coupling to move longitudinally in the spaced apart channels thereof. However, the teeth from the drive coupling and the driven coupling are square and fit the square shaped configurations of the channels so that there is a minimal ability or no ability to rotate the teeth within the channels. Thus the coupling member shown in U.S. Pat. No. 5,267,903 permits sliding movement within the channels, but does not permit any rotational movement within the channels.

Therefore, a primary object of the present invention is the provision of an improved U-joint construction for joining a drive shaft to a driven shaft.

A further object of the present invention is the provision of a U-joint construction which includes an intermediate coupling member having channels in its opposite sides, and which permits both longitudinal movement of the drive coupling and driven coupling within those channels as well as pivotal movement of the drive coupling and driven coupling within those channels.

A further object of the present invention is the provision of an improved U-joint construction which permits both the drive coupling and the driven coupling to pivot relative to the intermediate coupling about a vertical axis and a horizontal axis and to slide longitudinal with respect to the channels in the intermediate member.

A further object of the present invention is the provision of an improved U-joint construction which transfers a constant rotational velocity from the drive shaft to the driven shaft throughout misalignment of the drive shaft to the driven shaft.

A further object of the present invention is the provision of an improved U-joint construction which does not require lubricating.

A further object of the present invention is the provision of an improved U-join construction which is economical to manufacture and durable in use.

BRIEF SUMMARY OF THE INVENTION

The foregoing objects may be achieved coupling for joining a drive shaft and a driven shaft. The shaft coupling includes a drive coupling member attached to the drive shaft and having a drive bearing extending therefrom. A driven coupling member is attached to the driven shaft and has a driven bearing member extending therefrom. An intermediate coupling member capable of rotating about an intermediate rotational axis is positioned between the drive coupling member and the driven coupling member. A first channel on the intermediate coupling member includes a longitudinal first channel axis and extends transversely to the intermediate rotational axis of the intermediate coupling member. A second channel on the intermediate coupling member has a longitudinal second channel axis extending transversely to the intermediate rotational axis and also extending transversely to the first channel axis of the first channel.

The first and second channels each have a squared U-shaped cross section with the open U-end facing towards the drive bearing and the driven bearing respectively. The drive bearing protrudes within the first channel and engages the intermediate coupling member for rotating the intermediate coupling member about its intermediate rotational axis. The driven bearing member protrudes within the second channel and is engaged by the intermediate coupling member for transferring rotational movement from the intermediate coupling member to the driven shaft. The drive bearing is capable of pivoting within the first channel about a first pivotal axis extending in the same direction as the first channel axis and about a second pivotal axis transverse to the first channel axis. The driven bearing is capable of rotation within the second channel about a third pivotal axis extending in the same direction as the second channel axis and about a fourth pivotal axis transverse to the second channel axis.

According to another feature of the invention the shaft coupling includes a drive bearing having a rounded surface protruding within the squared U-shaped first channel and the driven bearing includes a rounded surface protruding within the squared U-shaped second channel. The drive and driven bearings are longitudinally movable within the first and second channels respectively along the first and second channel axes respectively.

According to another feature of the present invention the drive and driven bearings each have an elongated drive bearing axis and an elongated driven bearing axis respectively. The rounded surfaces of the drive and driven bearings are concentric to the drive bearing axis and the driven bearing axis respectively.

According to another feature of the present invention the U-shaped first and second channels each include a channel floor and opposite channel side walls. The drive bearing and driven bearing are movable away from the channel floors of the first and second channels respectively to permit the pivotal movement of the drive and driven bearings about the second and fourth pivotal axis respectively.

DETAILED DESCRIPTION OF THE PREFERRED EMBODIMENT

Figure 1:
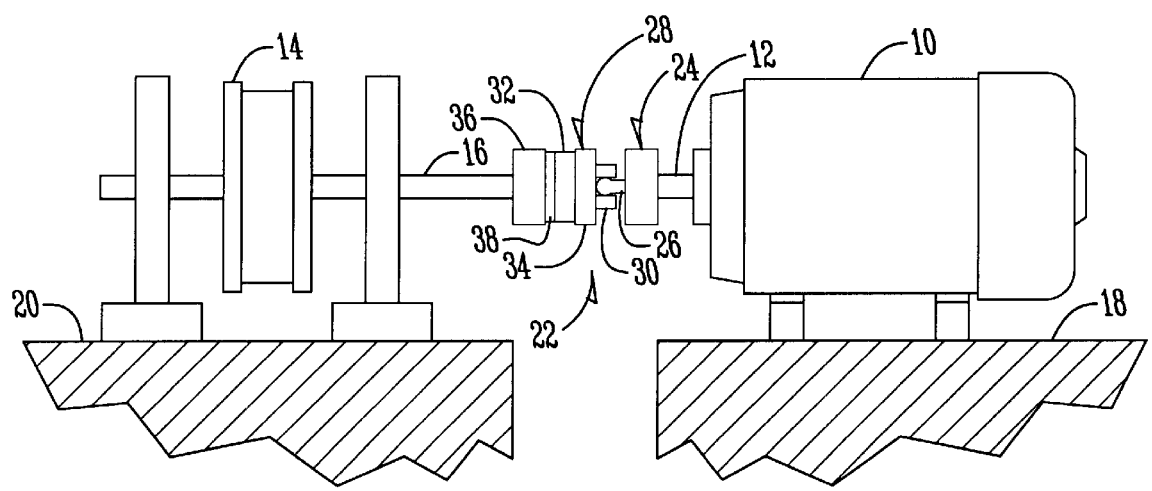
FIG. 1 is a side elevational view of a motor and a pulley interconnected by the U-shaped construction or shaft coupling of the present invention.

Referring to the drawings the numeral 10 generally designates a motor having a driven shaft 12 extending therefrom. The number 14 represents a pulley attached to a driven shaft 16. While pulley 14 is shown, other types of driven devices may be utilized without detracting form the invention. The present invention relates primarily to a coupling member which interconnects the drive shaft 12 and the driven shaft 16. Motor 10 is mounted to a stationary motor mount 18 and pulley 14 is mounted to a stationary pulley support 20 so that they cannot move relative to one another.

Interconnecting the drive shaft 12 and the driven shaft 16 is a U-joint construction or coupling 22. Coupling 22 includes a drive coupling member 24 having a drive bearing 26 extending therefrom. An intermediate coupling member 28 is engaged by the drive bearing 26 which resides in a first channel 30. The opposite side of intermediate coupling member 28 is provided with a second channel 32 which extends outwardly from a central hub 34.

A driven coupling member 36 is mounted on the driven shaft 16 and includes a driven bearing 38 which is seated within the second channel 32.

Figure 2:
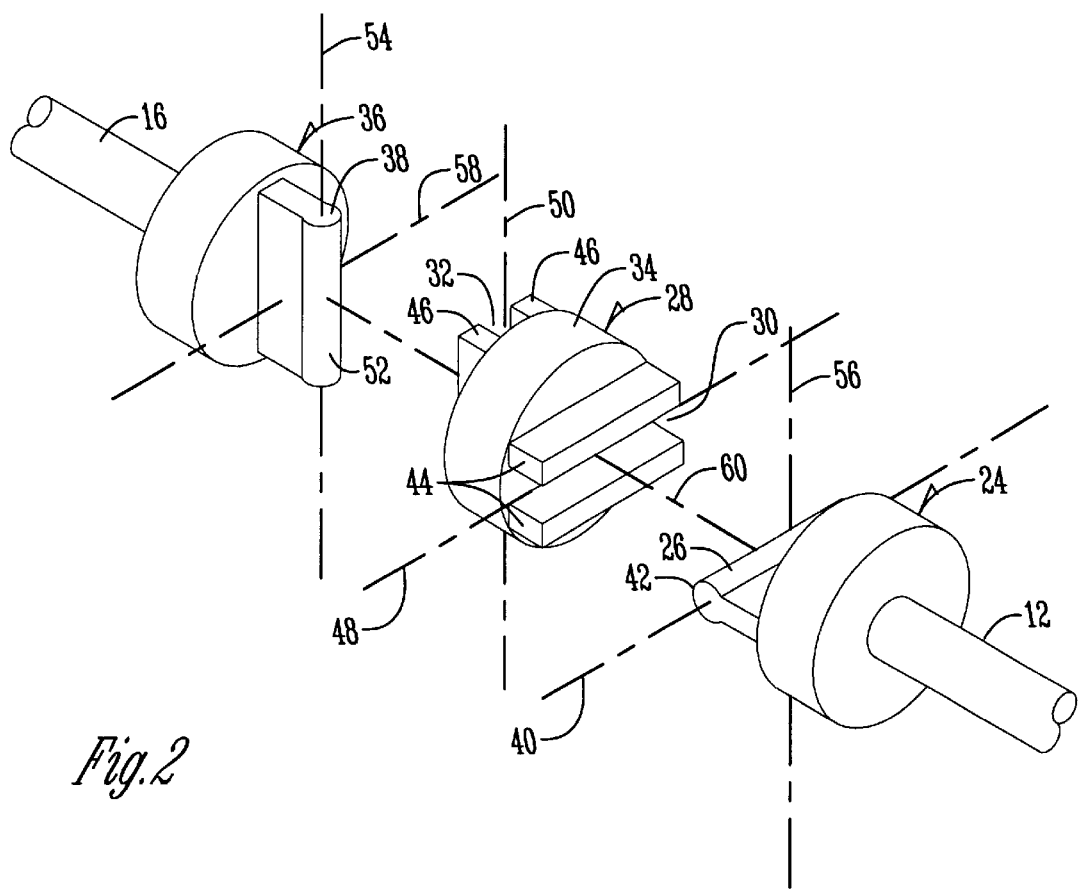
FIG. 2 is an exploded perspective view of the shaft coupling of the present invention.
Figure 3:
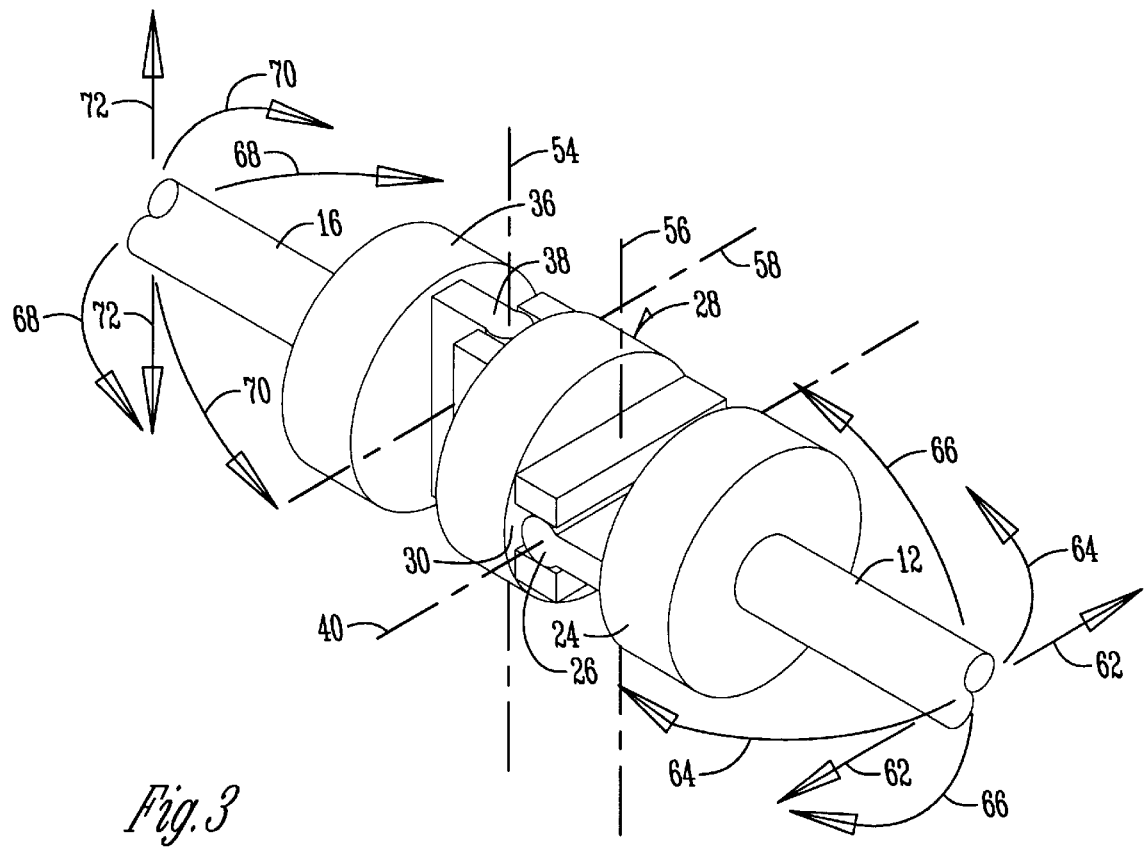
FIG. 3 is a pictorial view of the coupling of the present invention in its assembled condition.
Figure 4:
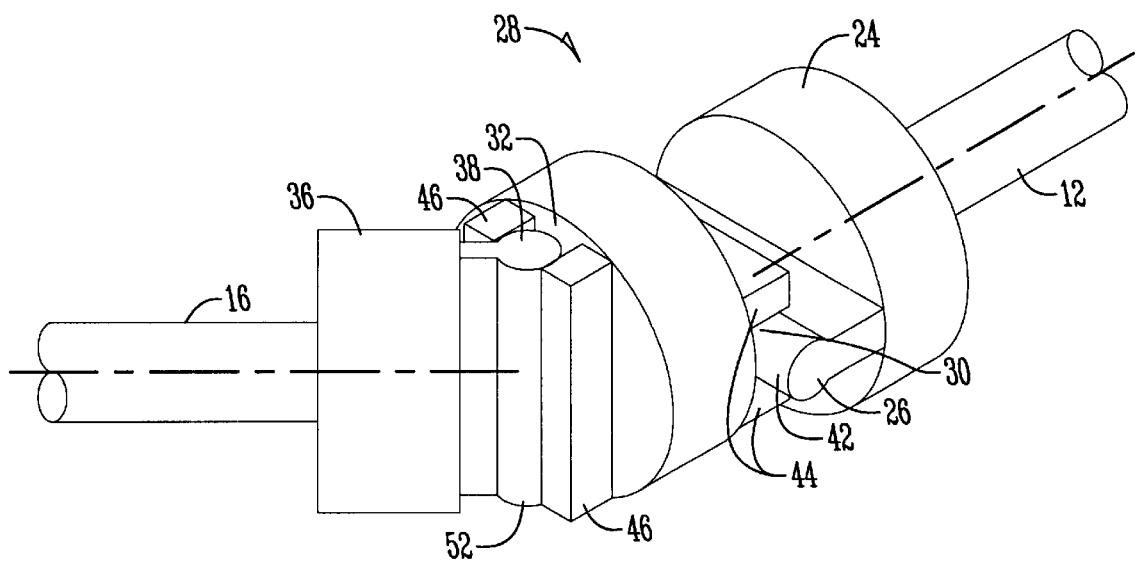
FIG. 4 is a perspective view of the shaft coupling of the present invention, showing the driven shaft and the drive shaft misaligned with respect to one another.

Referring to FIGS. 2, 3, and 4, the drive bearing is capable of numerous movements relative to the intermediate coupling member 28. The drive bearing is pivotal about a drive bearing axis 40 which coincides with the first channel axis 48. This pivotal movement is facilitated by a rounded surface 42 on the drive bearing 38. First channel 30 is U-shaped in cross section and is also squared. It is formed by parallel spaced apart ribs 44, 46.

Second channel 32 extends along a second channel axis 50. Which is perpendicular to the first channel axis 48 and which is also perpendicular to a rotational axis 60 of the intermediate coupling member 28.

The drive bearing 38 of driven coupling member 36 includes a rounded surface 52 which is concentric to a longitudinal bearing axis 54. The drive bearing 26 is pivotal within the first channel 30 about a vertical second pivot axis 56. This pivotal movement is possible because the first drive bearing 26 can move away form the floor of the first U-shaped channel 30 and can therefore tilt or pivot with that channel about the vertical axis 56. It is possible that the vertical axis 56 can move to the right or the left as viewed in FIG. 2, depending upon the particular manner in which the drive bearing 26 pivots, but the axis 56 is always perpendicular to the first channel axis 48.

Similarly the driven coupling member 36 can pivot about a second pivotal axis 58 in the same manner.

Referring to FIG. 3, the relative movements of the drive shaft 12 and the driven shaft 16 are shown. Drive shaft 12 is capable of longitudinal sliding movement as represented by the arrow 62. This sliding movement occurs by virtue of the drive bearing 26 sliding longitudinally within the first channel 30 along the first channel axis 40. The shaft 12 is also pivotal in the direction indicated by the arrow 64 by virtue of the fact that the drive bearing 26 is movable away from the floor of the U-shaped first channel 30 and can tilt about the vertical axis 56. The third movement of the drive shaft 12 is represented by the arrow 66 which represents the pivotal movement of shaft about the drive bearing axis 40.

Driven shaft 16 is also capable of similar movements represented by arrows 68, 70, and 72.

FIG. 4 illustrates the shafts 12, 16 misaligned with one another. In this articulated position the intermediate coupling member 28 has moved longitudinally along the longitudinal axis of the drive bearing 26 so that the drive bearing 26 protrudes from first channel 30. This illustrates the ability of the bearings 26, 38 to move longitudinal with the channels 30, 32.

It has been found that the present coupling member permits the shafts to become misaligned, but at the same time provides continuous smooth driving movement from the drive shaft 12 to the driven shaft 16. The velocity and torque of that is transferred remains constant.

In the drawings and specification there has been set forth a preferred embodiment of the invention, and although specific terms are employed, these are used in a generic and descriptive sense only and not for purposes of limitation. Changes in the form and the proportion of parts as well as in the substitution or equivalents are contemplated as circumstances may suggest of render expedient without departing form the spirit or scope of the invention ask further defined in the following claims.

What is claimed is:

1. A shaft coupling for joining a drive shaft and a driven shaft comprising:

a drive coupling member attached to said drive shaft and having a drive bearing extending therefrom;

a driven coupling member attached to said driven shaft and having a driven bearing extending therefrom;

an intermediate coupling member capable of rotating about an intermediate rotational axis between said drive coupling member and said driven coupling member;

a first channel formed by parallel spaced apart ribs on said intermediate coupling member, said first channel having a longitudinal first channel axis extending transversely to said intermediate rotational axis;

a second channel formed by parallel spaced apart ribs on said intermediate coupling having a longitudinal second channel axis extending transversely to said intermediate rotational axis and also extending transversely to said first channel axis of said first channel;

said first and second channels each having a squared U-shaped cross section with an open U-end facing toward said drive bearing and said driven bearing, respectively;

said drive bearing protruding within said first channel and engaging said intermediate coupling member for rotating said intermediate coupling member about said intermediate rotational axis;

said driven bearing protruding within said second channel and being engaged by said intermediate coupling member for transferring rotational movement from said intermediate coupling member to said driven shaft;

said drive bearing being capable of pivoting within said first channel about a first pivotal axis extending in the same direction as said first channel axis, and about a second pivotal axis transverse to said first channel axis;

said driven bearing being capable of rotation within said second channel about a third pivotal axis extending in the same direction as said second channel axis, and about a fourth pivotal axis transverse to said second channel axis.

2. A shaft coupling according to claim 1 wherein said drive bearing includes a rounded surface protruding within said squared U-shaped first channel, and said driven bearing including a rounded surface protruding within said squared U-shaped second channel.

3. A shaft coupling according to claim 2 wherein said drive and driven bearings are longitudinally movable within said first and second channels respectively along said first and second channel axes, respectively.

4. A shaft coupling according to claim 3 wherein said drive and driven bearings each have an elongated drive bearing axis and an elongated driven bearing axis respectively, extending in the same direction as said first and second channel axes, respectively, said rounded surfaces of said drive and driven bearings being concentric to said drive bearing axis and said driven bearing axis respectively.

5. A shaft coupling according to claim 4 wherein said U-shaped first and second channels each include a channel floor and opposite channel side walls, said drive bearing and said driven bearing being movable away from said channel floors of said first and second channels, respectively to permit said pivotal movement of said drive and driven bearings about said second and fourth pivotal axes respectively.

6. A shaft coupling for joining a drive shaft and a driven shaft comprising:
a drive coupling member attached to said drive shaft and having a drive bearing extending therefrom;
a driven coupling member attached to said driven shaft and having a driven bearing extending therefrom;
an intermediate coupling member capable of rotating about an intermediate rotational axis between said drive coupling member and said driven coupling member;
a first channel formed by parallel spaced apart ribs on said intermediate coupling member, said first channel having a longitudinal first channel axis extending transversely to said intermediate rotational axis;
a second channel formed by parallel spaced apart ribs on said intermediate coupling having a longitudinal second channel axis extending transversely to said intermediate rotational axis and also extending transversely to said first channel axis of said first channel;
said first and second channels each having a squared U-shaped cross section with an open U-end facing toward said drive bearing and said driven bearing, respectively;
said drive bearing protruding within said first channel and engaging said intermediate coupling member for rotating said intermediate coupling member about said intermediate rotational axis;
said driven bearing protruding within said second channel and being engaged by said intermediate channel for transferring rotational movement from said intermediate coupling member to said driven shaft;
said drive and driven bearings being capable of both pivotal movement within said first and second channels respectively and longitudinal sliding movement in the direction of said first and second channel axes respectively.

7. A shaft coupling according to claim 6 wherein said drive bearing and said driven bearing are elongated and each includes a longitudinal drive bearing axis and driven bearing axis, respectively, said drive bearing and said driven bearing also each having a curved surface within said first channel and said second channel respectively concentric with said longitudinal drive bearing axis and said longitudinal driven bearing axis respectively.

8. A shaft coupling according to claim 7 wherein said drive bearing and said driven bearing are pivotal about a drive bearing axis and a driven bearing axis respectively, said drive bearing axis and said driven bearing axis extending in the same direction as said longitudinal first and second channel axes, respectively.

9. A shaft coupling for joining a drive shaft and a driven shaft comprising:
a drive coupling member attached to said drive shaft and having a drive bearing extending therefrom;
a driven coupling member attached to said driven shaft and having a driven bearing extending therefrom;
an intermediate coupling member capable of rotating about an intermediate rotational axis between said drive coupling member and said driven coupling member;
a first channel on said intermediate coupling member, said first channel having a longitudinal first channel axis extending transversely to said intermediate rotational axis;
a second channel on said intermediate coupling having a longitudinal second channel axis extending transversely to said intermediate rotational axis and also extending transversely to said first channel axis of said first channel;
said first and second channels each having a squared U-shaped cross section with an open U-end facing toward said drive bearing and said driven bearing, respectively;
said drive bearing protruding within said first channel and engaging said intermediate coupling member for rotating said intermediate coupling member about said intermediate rotational axis;
said driven bearing protruding within said second channel and being engaged by said intermediate channel for transferring rotational movement from said intermediate coupling member to said driven shaft;
said drive bearing and said driven bearing each having a rounded surface within said squared U-shaped first and second channels, respectively.

10. A shaft coupling according to claim 9 wherein said drive bearing and said driven bearing are elongated and include a longitudinal drive bearing axis and driven bearing axis respectively, said drive bearing axis and said driven bearing axis extending in the same direction as said first and second longitudinal channel axes respectively.

11. A shaft coupling according to claim 10 wherein said respective rounded surfaces of drive bearing and driven bearing are concentric about said drive bearing axis and said driven bearing axis respectively.

12. A shaft coupling according to claim 11 wherein said drive bearing and said driven bearing are pivotal within said first and second channels about said drive bearing axis and said driven bearing axis, respectively.

13. A shaft coupling according to claim 12 wherein said drive bearing and said driven bearing are capable of longitudinal sliding movement within said first and second channels along said first and second channel axes respectively.

14. A shaft coupling for joining a drive shaft and a driven shaft comprising:
a drive coupling member attached to said drive shaft and having a drive bearing extending therefrom;
a driven coupling member attached to said driven shaft and having a driven bearing extending therefrom;
an intermediate coupling member capable of rotating about an intermediate rotational axis between said drive coupling member and said driven coupling member;
a first channel on said intermediate coupling member, said first channel having a longitudinal first channel axis extending transversely to said intermediate rotational axis;
a second channel on said intermediate coupling member having a longitudinal second channel axis extending transversely to said intermediate rotational axis and also extending transversely to said first channel axis of said first channel;

said first and second channels each having a squared U-shaped cross section with an open U-end facing toward said drive bearing and said driven bearing, respectively;

said drive bearing protruding within said first channel and engaging said intermediate coupling member for rotating said intermediate coupling member about said intermediate rotational axis;

said driven bearing protruding within said second channel and being engaged by said intermediate coupling member for transferring rotational movement from said intermediate coupling member to said driven shaft;

said drive bearing being capable of pivoting within said first channel about a first pivotal axis extending in the same direction as said first channel axis, and about a second pivotal axis transverse to said first channel axis;

said intermediate coupling member being capable of pivoting about said drive bearing within said first channel about a first pivotal axis extending in the same direction as said first channel axis, and about a second pivotal axis traverse to said first channel axis;

said driven bearing being capable of rotation within said second channel about a third pivotal axis extending in the same direction as said second channel axis, and about a fourth pivotal axis transverse to said second channel axis;

said intermediate coupling member being capable of rotating about said driven bearing within said second channel about a third pivotal axis extending in the same direction as said second channel axis, and about a fourth pivotal axis traverse to said second channel axis.

15. A shaft coupling according to claim 14 wherein said drive bearing includes a rounded surface protruding within said squared U-shaped first channel, and said driven bearing including a rounded surface protruding within said squared U-shaped second channel.

16. A shaft coupling according to claim 15 wherein said drive and driven bearings are longitudinally movable within said first and second channels respectively along said first and second channel axes, respectively.

17. A shaft coupling according to claim 16 wherein said drive and driven bearings each have an elongated drive bearing axis and an elongated driven bearing axis respectively, extending in the same direction as said first and second channel axes, respectively, said rounded surfaces of said drive and driven bearings being concentric to said drive bearing axis and said driven bearing axis respectively.

18. A shaft coupling according to claim 17 wherein said U-shaped first and second channels each include a channel floor and opposite channel side walls, said drive bearing and said driven bearing being movable away from said channel floors of said first and second channels, respectively to permit said pivotal movement of said drive and driven bearings about said second and fourth pivotal axes respectively.

19. A shaft coupling for joining a drive shaft and a driven shaft comprising:

a drive coupling member attached to said drive shaft and having a drive bearing extending therefrom;

a driven coupling member attached to said driven shaft and having a driven bearing extending therefrom;

an intermediate coupling member capable of rotating about an intermediate rotational axis between said drive coupling member and said driven coupling member;

a first channel on said intermediate coupling member, said first channel having a longitudinal first channel axis extending transversely to said intermediate rotational axis;

a second channel on said intermediate coupling having a longitudinal second channel axis extending transversely to said intermediate rotational axis and also extending transversely to said first channel axis of said first channel;

said first and second channels each having a squared U-shaped cross section with an open U-end facing toward said drive bearing and said driven bearing, respectively;

said drive bearing protruding within said first channel and engaging said intermediate coupling member for rotating said intermediate coupling member about said intermediate rotational axis;

said driven bearing protruding within said second channel and being engaged by said intermediate channel for transferring rotational movement from said intermediate coupling member to said driven shaft;

said drive and driven bearings being capable of both pivotal movement within said first and second channels respectively and longitudinal sliding movement in the direction of said first and second channel axes respectively;

said intermediate coupling member being capable of pivotal movement about said drive and driven bearing within said first and second channels respectively and longitudinal sliding movement in the direction of said first and second channel axes.

20. A shaft coupling according to claim 19 wherein said drive bearing and said driven bearing are elongated and each includes a longitudinal drive bearing axis and driven bearing axis, respectively, said drive bearing and said driven bearing also each having a curved surface within said first channel and said second channel respectively concentric with said longitudinal drive bearing axis and said longitudinal driven bearing axis respectively.

21. A shaft coupling according to claim 20 wherein said drive bearing and said driven bearing are pivotal about a drive bearing axis and a driven bearing axis respectively, said drive bearing axis and said driven bearing axis extending in the same direction as said longitudinal first and second channel axes, respectively.

22. A shaft coupling for joining a drive shaft and a driven shaft comprising:

a drive coupling member attached to said drive shaft and having a drive bearing extending therefrom;

a driven coupling member attached to said driven shaft and having a driven bearing extending therefrom;

an intermediate coupling member capable of rotating about an intermediate rotational axis between said drive coupling member and said driven coupling member;

a first channel on said intermediate coupling member, said first channel having a longitudinal first channel axis extending transversely to said intermediate rotational axis;

a second channel on said intermediate coupling having a longitudinal second channel axis extending transversely to said intermediate rotational axis and also extending transversely to said first channel axis of said first channel;

said first and second channels each having a squared U-shaped cross section with an open U-end facing toward said drive bearing and said driven bearing, respectively;

said drive bearing protruding within said first channel and engaging said intermediate coupling member for rotating said intermediate coupling member about said intermediate rotational axis;

said driven bearing protruding within said second channel and being engaged by said intermediate coupling member for transferring rotational movement from said intermediate coupling member to said driven shaft;

said drive bearing and said driven bearing each having a rounded surface within said squared U-shaped first and second channels, respectively;

said drive bearing being capable of pivoting within said first channel about a first pivotal axis extending in the same direction as said first channel axis, and about a second pivotal axis transverse to said first channel axis;

said driven bearing being capable of rotation within said second channel about a third pivotal axis extending in the same direction as said second channel axis, and about a fourth pivotal axis transverse to said second channel axis.

23. A shaft coupling according to claim 22 wherein said drive bearing includes a rounded surface protruding within said squared U-shaped first channel, and said driven bearing including a rounded surface protruding within said squared U-shaped second channel.

24. A shaft coupling according to claim 23 wherein said drive and driven bearings are longitudinally movable within said first and second channels respectively along said first and second channel axes, respectively.

25. A shaft coupling according to claim 24 wherein said drive and driven bearings each have an elongated drive bearing axis and an elongated driven bearing axis respectively, extending in the same direction as said first and second channel axes, respectively, said rounded surfaces of said drive and driven bearings being concentric to said drive bearing axis and said driven bearing axis respectively.

26. A shaft coupling according to claim 25 wherein said U-shaped first and second channels each include a channel floor and opposite channel side walls, said drive bearing and said driven bearing being movable away from said channel floors of said first and second channels, respectively to permit said pivotal movement of said drive and driven bearings about said second and fourth pivotal axes respectively.

27. A shaft coupling for joining a drive shaft and a driven shaft comprising:

a drive coupling member attached to said drive shaft and having a drive bearing extending therefrom;

a driven coupling member attached to said driven shaft and having a driven bearing extending therefrom;

an intermediate coupling member capable of rotating about an intermediate rotational axis between said drive coupling member and said driven coupling member;

a first channel on said intermediate coupling member, said first channel having a longitudinal first channel axis extending transversely to said intermediate rotational axis;

a second channel on said intermediate coupling having a longitudinal second channel axis extending transversely to said intermediate rotational axis and also extending transversely to said first channel axis of said first channel;

said first and second channels each having a squared U-shaped cross section with an open U-end facing toward said drive bearing and said driven bearing, respectively;

said drive bearing protruding within said first channel and engaging said intermediate coupling member for rotating said intermediate coupling member about said intermediate rotational axis;

said driven bearing protruding within said second channel and being engaged by said intermediate channel for transferring rotational movement from said intermediate coupling member to said driven shaft;

said drive bearing and said driven bearing each having a rounded surface within said squared U-shaped first and second channels, respectively;

said drive and driven bearings being capable of both pivotal movement within said first and second channels respectively and longitudinal sliding movement in the direction of said first and second channel axes respectively.

28. A shaft coupling according to claim 27 wherein said drive bearing and said driven bearing are elongated and each includes a longitudinal drive bearing axis and driven bearing axis, respectively, said drive bearing and said driven bearing also each having a curved surface within said first channel and said second channel respectively concentric with said longitudinal drive bearing axis and said longitudinal driven bearing axis respectively.

29. A shaft coupling according to claim 28 wherein said drive bearing and said driven bearing are pivotal about a drive bearing axis and a driven bearing axis respectively, said drive bearing axis and said driven bearing axis extending in the same direction as said longitudinal first and second channel axes, respectively.

* * * * *